(12) United States Patent
Zhao et al.

(10) Patent No.: US 11,274,562 B2
(45) Date of Patent: Mar. 15, 2022

(54) GAS TURBINE COMPONENTS AND METHODS OF ASSEMBLING THE SAME

(71) Applicant: General Electric Company, Schenectady, NY (US)

(72) Inventors: Jianzhi Zhao, Shanghai (CN); Chuan Lin, Shanghai (CN); Shizhong Wang, Shanghai (CN); Mihir Kumar Lal, Greenville, SC (US); Richard Todd Everhart, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 194 days.

(21) Appl. No.: 16/608,214

(22) PCT Filed: Apr. 25, 2017

(86) PCT No.: PCT/CN2017/081864
§ 371 (c)(1),
(2) Date: Oct. 25, 2019

(87) PCT Pub. No.: WO2018/195778
PCT Pub. Date: Nov. 1, 2018

(65) Prior Publication Data
US 2020/0165923 A1    May 28, 2020

(51) Int. Cl.
*F01D 5/28* (2006.01)
*C23C 4/11* (2016.01)
*C23C 4/134* (2016.01)
*F01D 25/08* (2006.01)

(52) U.S. Cl.
CPC .............. *F01D 5/288* (2013.01); *C23C 4/11* (2016.01); *F01D 5/284* (2013.01); *F01D 5/286* (2013.01); *F01D 25/08* (2013.01); *C23C 4/134* (2016.01); *F05D 2220/32* (2013.01); *F05D 2230/90* (2013.01); *F05D 2260/95* (2013.01); *F05D 2300/134* (2013.01)

(58) Field of Classification Search
CPC .... F05D 2300/134; F01D 5/288; F01D 5/286; F01D 5/20; F01D 5/282; F01D 5/284
See application file for complete search history.

(56) References Cited

U.S. PATENT DOCUMENTS

| | | | |
|---|---|---|---|
| 4,996,117 A * | 2/1991 | Chu | ........................ C23C 4/11 428/633 |
| 6,617,049 B2 * | 9/2003 | Darolia | ............... C23C 28/3215 416/241 B |
| 7,374,818 B2 | 5/2008 | Bhatia et al. | |

(Continued)

FOREIGN PATENT DOCUMENTS

| CN | 1868973 A | 11/2006 |
|---|---|---|
| EP | 2138477 A2 | 12/2009 |

OTHER PUBLICATIONS

Corrected version of the International Search Report of the International Searching Authority for PCT/CN2017/081864 dated Feb. 14, 2018.

*Primary Examiner* — Michael Lebentritt
*Assistant Examiner* — Brian Christopher Delrue
(74) *Attorney, Agent, or Firm* — Armstrong Teasdale LLP (57) ABSTRACT

A gas turbine component includes a substrate and a corrosion resistant layer coupled to the substrate. The corrosion resistant layer includes zirconium silicate and is configured to protect the substrate from exposure to a vanadium corrodent.

19 Claims, 4 Drawing Sheets

(56) References Cited

U.S. PATENT DOCUMENTS

| | | | |
|---|---|---|---|
| 2003/0138660 A1* | 7/2003 | Darolia | C23C 28/3455 |
| | | | 428/633 |
| 2008/0124479 A1* | 5/2008 | Hazel | C04B 41/52 |
| | | | 427/452 |
| 2009/0148628 A1* | 6/2009 | Raybould | C23C 18/1216 |
| | | | 427/585 |
| 2009/0324930 A1 | 12/2009 | Tulyani et al. | |
| 2014/0202597 A1* | 7/2014 | Waniuk | C04B 35/01 |
| | | | 148/538 |
| 2015/0068188 A1* | 3/2015 | Tolpygo | C23C 14/083 |
| | | | 60/39.01 |
| 2017/0101539 A1 | 4/2017 | Pan et al. | |

\* cited by examiner

GAS TURBINE COMPONENTS AND METHODS OF ASSEMBLING THE SAME

BACKGROUND

The field of this disclosure relates generally to gas turbine components and, more particularly, to a corrosion resistant coating for use with a gas turbine component.

At least some known gas turbine assemblies include a compressor, a combustor, and a turbine. Gases flow into the compressor and are compressed. The compressed gases are then discharged into the combustor, mixed with fuel, and ignited to generate combustion gases. The combustion gases are channeled from the combustor through the turbine, thereby driving the turbine which, in turn, may power an electrical generator coupled to the turbine.

To pursue the maximum energy conversion efficiency, turbines are typically operated at a temperature as high as possible. Components served at the hot area are mainly made of metal alloys or ceramics, which may have a limited service lifetime when exposed to the high temperature working environment. Furthermore, at least some known turbines use fuel containing vanadium that is known to shorten the service lifetime of turbine components. At least some known turbines include a thermal barrier coating (TBC) material, such as yttria-stabilized zirconia, to increase their high temperature durability. However, in at least some known turbines that use fuel containing vanadium, the TBC is known to be susceptible to spalling in the combustion environment due to vanadium corrosion. Such spalling can further reduce the service lifetime of the turbine components. Vanadium can also cause the corrosion of bare alloy at high temperatures.

BRIEF DESCRIPTION

In one aspect, a gas turbine component is provided. The gas turbine component includes a substrate and a corrosion resistant layer coupled to the substrate. The corrosion resistant layer includes zirconium silicate and is configured to protect the substrate from exposure to a vanadium corrodent.

In another aspect, a method of assembling a gas turbine component is provided. The method includes providing a substrate and applying a corrosion resistant layer to the substrate. The corrosion resistant layer includes zirconium silicate and is configured to protect the substrate from exposure to a vanadium corrodent.

In another aspect, a turbine for use in a gas turbine engine is provided. The turbine includes a turbine blade and a corrosion resistant layer coupled to the turbine blade. The corrosion resistant layer includes zirconium silicate and is configured to protect the turbine blade from exposure to a vanadium corrodent.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The methods and systems described herein facilitate extending the service lifetime of turbine components by protecting the turbine components, such as, but not limited to, turbine rotor blades and turbine stator vanes, from vanadium corrosion. For example, embodiments of a turbine component include a substrate and a corrosion resistant layer coupled to the substrate. More specifically, a corrosion resistant layer of zirconium silicate is applied to the substrate to protect the substrate from exposure to a vanadium corrodent that may be channeled through the turbine. In addition, in some embodiments, a corrosion resistant layer of zirconium silicate is applied to a thermal barrier coating on the substrate to protect the thermal barrier coating from being exposed to the vanadium corrodents, which may limit the service lifetime of the thermal barrier coating. Extending the service lifetime of the turbine components, and the service lifetime of an optional thermal barrier coating, results in decreases in turbine manufacturing and maintenance costs as well as a decrease in turbine maintenance time.

Figure 1:
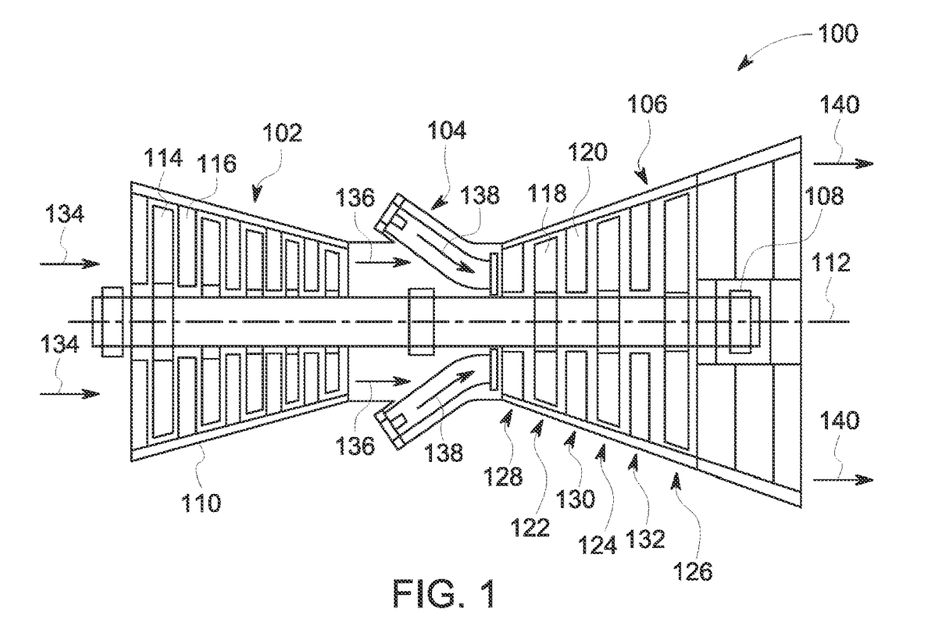
FIG. 1 is a schematic view of an exemplary gas turbine assembly.

FIG. 1 illustrates an exemplary gas turbine assembly 100. In the exemplary embodiment, gas turbine assembly 100 has a compressor 102, a combustor 104, and a turbine 106 coupled in flow communication with one another within a casing 110 and spaced along a centerline axis 112. Compressor 102 includes a plurality of rotor blades 114 and a plurality of stator vanes 116, and turbine 106 likewise includes a plurality of rotor blades 118 and a plurality of stator vanes 120. Notably, turbine rotor blades 118 (or buckets) are grouped in a plurality of annular, axially-spaced stages (e.g., a first rotor stage 122, a second rotor stage 124, and a third rotor stage 126) that are rotatable in unison via an axially-aligned rotor shaft 108. Similarly, stator vanes 120 (or nozzles) are grouped in a plurality of annular, axially-spaced stages (e.g., a first stator stage 128, a second stator stage 130, and a third stator stage 132) that are axially-interspaced with rotor stages 122, 124, and 126. As such, first rotor stage 122 is spaced axially between first and second stator stages 128 and 130 respectively, second rotor stage 124 is spaced axially between second and third stator stages 130 and 132 respectively, and third rotor stage 126 is spaced downstream from third stator stage 132.

In operation, working gases 134 (e.g., ambient air) flow into compressor 102 and are compressed and channeled into combustor 104. Compressed gases 136 are mixed with fuel and ignited in combustor 104 to generate combustion gases 138 that are channeled into turbine 106. In an axially-sequential manner, combustion gases 138 flow through first stator stage 128, first rotor stage 122, second stator stage 130, second rotor stage 124, third stator stage 132, and third rotor stage 126 interacting with rotor blades 118 to drive rotor shaft 108 which may, in turn, drive an electrical generator (not shown) coupled to rotor shaft 108. Combustion gases 138 are then discharged from turbine 106 as exhaust gases 140.

Figure 2:
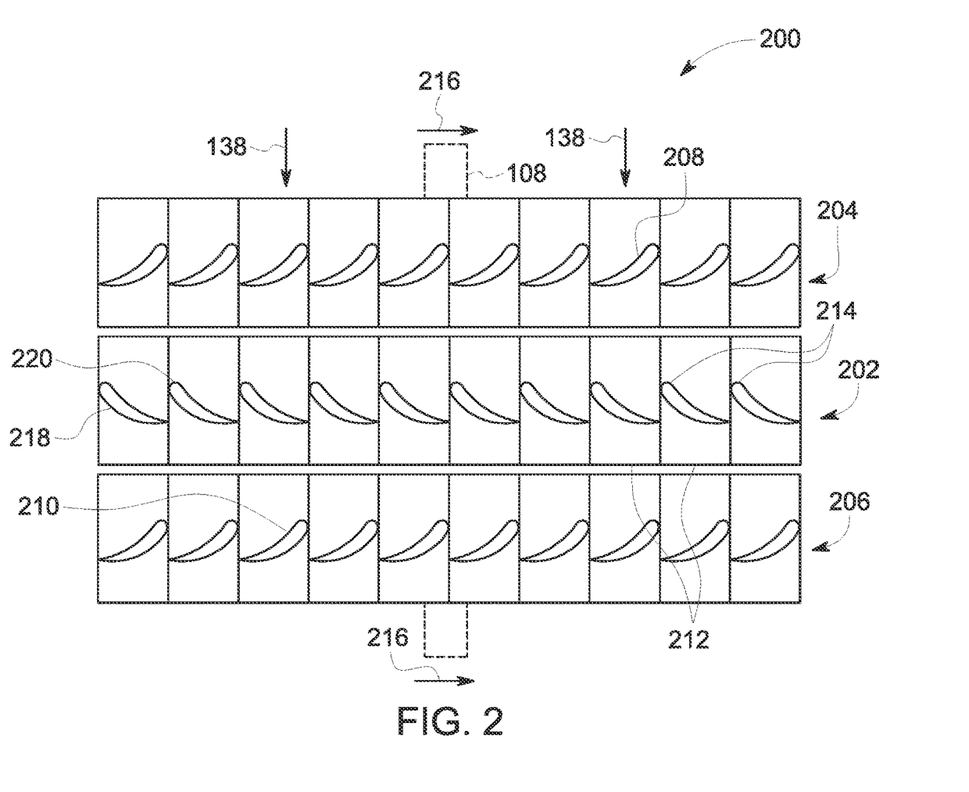
FIG. 2 is a diagram of an exemplary section of the gas turbine assembly shown in FIG. 1.

FIG. 2 is a diagram of an exemplary section 200 of gas turbine assembly 100. In the exemplary embodiment, section 200 includes a stator stage 202 (such as, for example, second stator stage 130) spaced axially between an upstream rotor stage 204 (such as, for example, first rotor stage 122) and a downstream rotor stage 206 (such as, for example, second rotor stage 124). Upstream rotor stage 204 has an annular arrangement of circumferentially-spaced, airfoil-shaped rotor blades 208, and downstream rotor stage 206 has an annular arrangement of circumferentially-spaced, airfoil-shaped rotor blades 210. Notably, upstream rotor stage 204 and downstream rotor stage 206 of section 200 are coupled to, and are rotatable with, rotor shaft 108 about centerline axis 112 of gas turbine assembly 100.

Stator stage 202 includes a plurality of stator vane segments 212 that are coupled together in an annular formation. In the exemplary embodiment, each segment 212 may instead have only one stator vane 214 (commonly referred to as a "singlet"). In other embodiments, each segment 212 includes a pair of stator vanes 214 (commonly referred to as a "doublet"), may have three stator vanes 214 (commonly referred to as a "triplet"), or may have four stator vanes 214 (commonly referred to as a "quadruplet"). Alternatively, stator stage 202 may have any suitable number segments 212, and/or stator vanes 214 per segment 212, that enables section 200 to function as described herein.

During operation of gas turbine assembly 100 with section 200 used in turbine 106, combustion gases 138 discharged from combustor 104 are channeled through upstream rotor stage 204, stator stage 202, and into downstream rotor stage 206. As such, combustion gases 138 drive rotor stages 204 and 206 in a rotational direction 216 relative to stator stage 202.

Figure 3:
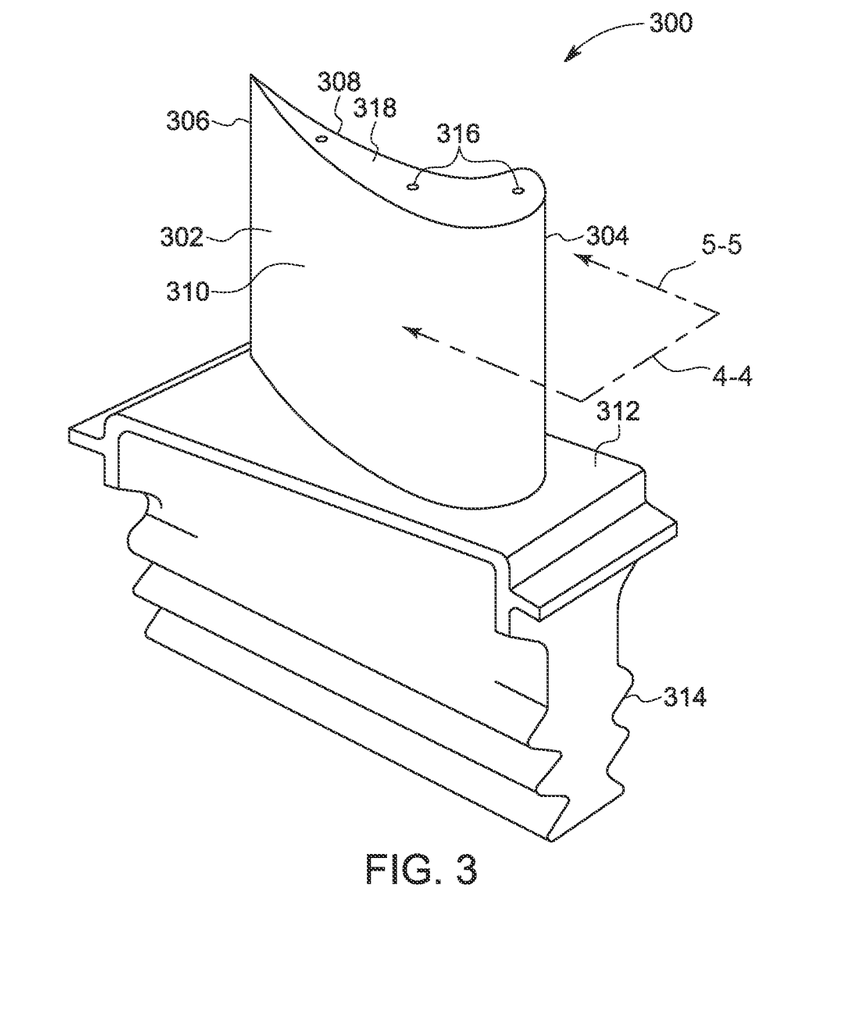
FIG. 3 is a perspective view of an exemplary turbine component of the section shown in FIG. 2.

FIG. 3 is a perspective view of an exemplary turbine component 300 of section 200 shown in FIG. 2. In the exemplary embodiment, component 300 is one of rotor blades 208 or 210 or stator vane 212. Component 300 generally includes an airfoil 302 against which hot combustion gases 138 are directed during operation of gas turbine engine 100, and whose surfaces are therefore subjected to potential environmental attack by high temperature environments, as well as other environmental contaminants such as, but not limited to vanadium oxide. Airfoil 302 includes a leading edge 304, a trailing edge 306, a pressure side 308, and a suction side 310. Pressure side 308 is concavely shaped, and suction side 310 is convexly shaped such that, in operation, hot combustion gas 138 is directed against pressure side 308. Component 300 includes a shank portion 312 coupled to airfoil 302 and a dovetail portion 314 extending from shank portion 312 and anchored to a turbine disk (not shown). In some embodiments of component 300, a number of internal passages extend through the interior of airfoil 302, ending in openings indicated as 316 in the surface of airfoil 302. Although shown only on a radially outer surface 318 of airfoil 302, openings 316 may be formed in any of leading edge 304, trailing edge 306, pressure side 308, and suction side 310. During operation, a flow of cooling air is directed through the internal passages (not shown) to cool or reduce the temperature of airfoil 302.

Figure 4:
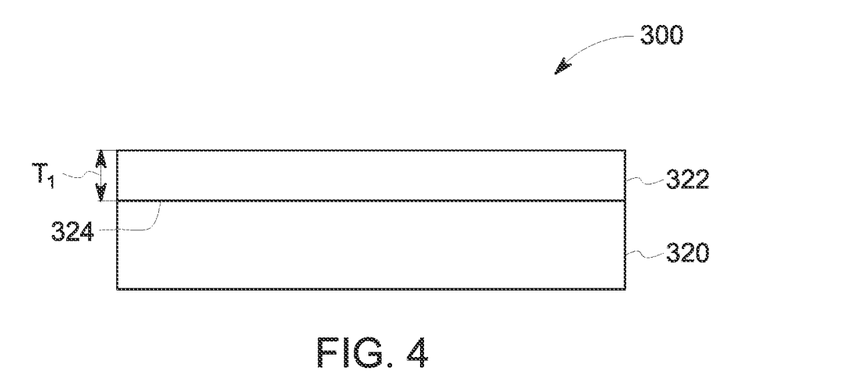
FIG. 4 is a cross section of the component shown in FIG. 4 taken across line 4-4 in FIG. 3.

FIG. 4 is a cross section of component 300 shown in FIG. 4 taken across line 4-4 in FIG. 3. In the exemplary embodiment, component 300 includes a substrate 320 and a corrosion resistant layer 322 coupled to substrate 320. In the exemplary embodiment, component 300 includes a substrate 320 formed from a metallic alloy, such as but not limited to, nickel-based superalloys that incorporate any combination of chromium, cobalt, and rhenium. Alternatively, substrate 320 is formed from a ceramic material, such as but not limited to, silicon carbide fiber reinforced ceramic matrix composite. Generally, substrate 320 is formed from any material that facilitates operation of component 300 as described herein. Component 300 is fabricated from predetermined materials so as to have an ideal range of operating temperatures within which structural integrity is facilitated to be maintained. However, it may be desirable in some instances to operate gas turbine assembly 100 in a manner that may expose component 300 to combustion gases 138 that contain various corrosive substances. For example, fuel that contains vanadium can create a vanadium corrodent after combustion that may corrode bare substrate 320 at high temperatures. Because of this corrosion, in the exemplary embodiment, corrosion resistant layer 322 is applied to substrate 320 in an effort to protect substrate 320 from exposure to a vanadium corrodent.

As used herein, the term "corrosion resistant layer" (hereafter "CRL") refers to those coating systems which provide environmental protection, i.e., function as environmental barriers in protecting against environmental exposure caused by, for example, high temperature, aqueous environments, various corrodents, i.e., provide corrosion resistance, etc., and which are chemically compatible (e.g., relatively inert, etc.) with regard to the material of substrate 320.

Furthermore, as used herein, the term "corrodents" refers to products of the combustion process contained in combustion gases 138 that may have a corrosive effect on substrate 320 or other layering on substrate 320, as described in further detail below. Such corrodents may include oxygen, sodium, chlorine and saline mixtures, water vapor, vanadium oxides, sulfur, and similar contaminants under high temperature conditions. These contaminants may be carried by high velocity combustion gas streams at temperatures from 850° C. (1560° F.) to 1800° C. (3272° F.) or higher.

In the exemplary embodiment, CRL 322 is applied to a surface 324 of substrate 320. Surface 324 of substrate 320 can be pretreated prior to forming CRL 322 thereon to remove substrate fabrication contamination (e.g., cleaning surface 324) to improve adherence thereto, etc. For example, substrate 320 can be pretreated by subjecting surface 324 to a grit blasting step. This grit blasting step is typically carried out carefully in order to avoid damage to surface 324 of substrate 320. The particles used for the grit blasting are hard enough to remove the undesired contamination but not so hard as to cause significant erosive removal of substrate 320. When processing substrate 320, grit blasting is typically carried out with alumina particles, typically having a particle size of about 30 microns or less, and typically at a velocity of from about 150 to about 200 n/sec.

In the exemplary embodiment, CRL 322 is adjacent to and overlaying surface 324 of substrate 320. CRL 322 includes one or more layers of corrosion resistant materials such as corrosion resistant metal silicates. More specifically, in the exemplary embodiment, CRL 322 is at least one layer of zirconium silicate applied to surface 324 of substrate 320. As described in further detail herein, zirconium silicate was tested as a stable material in the presence of vanadium corrodents to provide a vanadium resistant layer or coating for gas turbine components, such as component 300. In the exemplary embodiment, as shown in FIG. 4, component 300 includes only substrate 320 and CRL 322 such that CRL provides both a vanadium resistant layer and a thermal barrier coating on substrate 320. In other embodiments, as described herein, component 300 includes additional layers of material on substrate 320. However, in the exemplary embodiment, and in such alternative embodiments, zirconium silicate CRL 322 is an outermost layer of component 300 such that CRL 322 is exposed to combustion gases 138 flowing passed component 300. In other embodiments, component 300 includes additional layers of material laid over CRL 322.

Furthermore, in the exemplary embodiment, CRL 322 includes only zirconium silicate. That is, CRL 322 includes 100% zirconium silicate and the zirconium silicate is not mixed with other corrosion prevention materials. More specifically, zirconium silicate may be mixed with a bonding material for bonding of CRL 322 to substrate 320, but the corrosion resistant material of CRL 322 is only zirconium silicate. Even more specifically, zirconium silicate is mixed with a binder material when CRL 322 is applied to substrate 320 using a slurry or dipping process, oxide bonding techniques, or pack cementation techniques, etc. Whereas zirconium silicate alone may be use when CRL 322 is applied to substrate 320 using, physical vapor deposition (PVD) techniques (e.g., electron beam physical vapor deposition (EB-PVD), ion plasma, etc., thermal spray techniques (e.g., plasma spray such as air plasma spray), chemical vapor deposition (CVD) techniques, etc. Generally, CRL 322 is applied to substrate 320 using processes and methods known to those skilled in the art. In other embodiments, zirconium silicate may be mixed with other corrosion resistant materials to form CRL 322.

In the exemplary embodiment, a specific formulation of zirconium silicate is to be used. More specifically, the formulation is:

$$Zr_xM1-xSi_yN1-yO4+z$$

where M includes alkaline earth metals, group IV and V transition metals, rare-earth metals, or a combination thereof;

where N includes aluminum, phosphorus, or a combination thereof;

where  $z=((4-m)(x-1)+(4-n)(y-1))/2$;

where m is the valance of M, and n is the valance of N; and where $0.7 < x \leq 1$, and $0.7 < y \leq 1$.

The above formula indicates that CRL 322 may include a range of possible materials, as long as zirconium silicate (ZrSiO2) is included. More specifically, the formula shows that the base material for CRL 322 is zirconium silicate, but that CRL 322 is not limited to only zirconium silicate. The formula further shows that the both the zirconium and silicon elements in ZrSiO2 can be further doped with additional different elements to a certain degree while still keeping the same structure and anti-corrosion property as ZrSiO2.

In the exemplary embodiment, CRL 322 includes a first thickness $T_1$ within a range of approximately 0.0005 inches and approximately 0.030 inches. Specifically, CRL 322 includes a first thickness $T_1$ within a range of approximately 0.0005 inches and approximately 0.020 inches. More specifically, CRL 322 includes a first thickness $T_1$ within a range of approximately 0.0005 inches and approximately 0.010 inches. Even more specifically, CRL 322 includes a first thickness $T_1$ within a range of approximately 0.003 inches and approximately 0.010 inches. Alternatively, CRL 322 includes any thickness $T_1$ that facilitates operation of component 300 as described herein.

Figure 5:
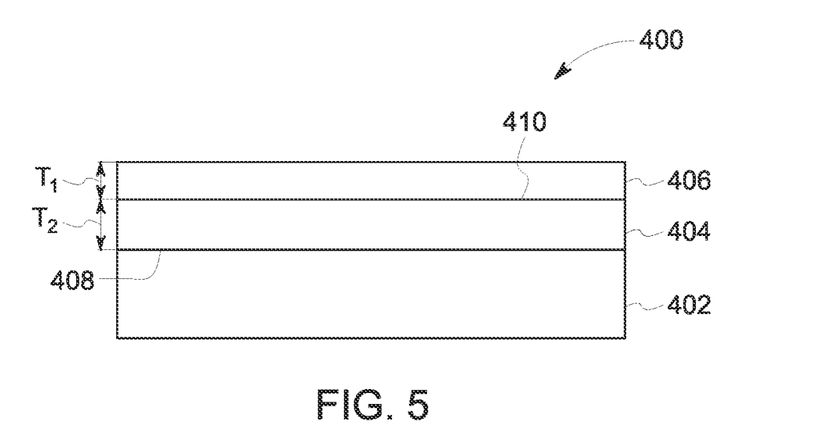
FIG. 5 is a cross section of an alternative component taken across line 5-5 in FIG. 3

FIG. 5 is a cross section of an alternative component 400 taken across line 5-5 in FIG. 3. Similar to component 300 above, component 400 can be any of turbine rotor blades 208 or 210 or turbine stator vane 214 (all shown in FIG. 2). As shown in FIG. 5, component 400 includes a substrate 402, a thermal barrier coating 404 coupled to substrate 402, and a corrosion resistant layer 406 coupled to thermal barrier coating 404. Substrate 402 is substantially similar to substrate 320 and is formed from a metallic alloy, such as but not limited to, nickel-based superalloys that incorporate any combination of chromium, cobalt, and rhenium. Alternatively, substrate 402 is formed from a ceramic material, such as but not limited to, silicon carbide fiber reinforced ceramic matrix composite. Generally, substrate 402 is formed from any material that facilitates operation of component 400 as described herein.

As used herein, the term "corrosion resistant layer" (hereafter "CRL") refers to those coating systems which provide environmental protection, i.e., function as environmental barriers in protecting against environmental exposure caused by, for example, high temperature, aqueous environments, various corrodents, i.e., provide corrosion resistance, etc., and which are chemically compatible (e.g., relatively inert, etc.) with regard to the material of substrate 402 and thermal barrier coating 404.

Furthermore, as used herein, the term "corrodents" refers to products of the combustion process contained in combustion gases 138 that may have a corrosive effect on substrate 402 or other layering on substrate 402, as described in further detail below. Such corrodents may include oxygen, sodium, chlorine and saline mixtures, water vapor, vanadium oxides, sulfur, and similar contaminants under high temperature conditions. These contaminants may be carried by high velocity combustion gas streams at temperatures from 850° C. (1560° F.) to 1800° C. (3272° F.) or higher.

As used herein, the term "thermal barrier coating" (hereafter "TBC") refers to those coatings that reduce heat flow to substrate 402 by forming a thermal barrier, and which include ceramic materials have a melting point that is typically at least about 1426° C. (2600° F.), and more typically in the range of from about 1900° to about 2750° C. (about 3450° to about 4980° F.). Suitable ceramic materials for TBC 404 include, aluminum oxide (alumina), i.e., those compounds and compositions including Al2O3, including unhydrated and hydrated forms, various zirconias, in particular phase-stabilized zirconias (e.g., zirconia blended with various stabilizer metal oxides such as yttrium oxides), such as yttria-stabilized zirconias, ceria-stabilized zirconias, calcia-stabilized zirconias, scandia-stabilized zirconias, magnesia-stabilized zirconias, india-stabilized zirconias, ytterbia-stabilized zirconias, etc., as well as mixtures of such stabilized zirconias.

In the embodiment shown in FIG. 5, TBC 404 includes a yttria-stabilized zirconia (hereinafter YSZ) that does not include zirconium silicate. Suitable yttria-stabilized zirconias can include from about 1 to about 20% yttria (based on the combined weight of yttria and zirconia), and more typically from about 3 to about 10% yttria. These phase-stabilized zirconias can further include one or more of a second metal (e.g., a lanthanide or actinide) oxide such as dysprosia, erbia, europia, gadolinia, neodymia, praseodymia, urania, and hafnia to further reduce thermal conductivity of the thermal barrier coating.

Component 400 is fabricated from predetermined materials so as to have an ideal range of operating temperatures within which structural integrity is facilitated to be maintained. However, it may be desirable in some instances to operate gas turbine assembly 100 in a manner that may expose component 400 to high temperature combustion gases 138 that contain various corrosive substances. For example, fuel that contains vanadium can create a vanadium corrodent after combustion that may corrode TBC 404 at high temperatures. Because of this corrosion, in the exemplary embodiment, corrosion resistant layer 406 is applied to TBC 404 in an effort to protect TBC 404 from exposure to a vanadium corrodent.

In the embodiment shown in FIG. 5, TBC 404 is applied to a surface 408 of substrate 402. Similar to surface 324 of substrate 320, surface 408 may be pretreated prior to forming TBC 404 thereon to remove substrate fabrication contamination to improve adherence thereto, etc. As shown in FIG. 5, TBC 404 is adjacent and overlying surface 408 and CRL 406 is adjacent and overlaying TBC 404 such that TBC 404 is positioned between substrate 402 and CRL 406. In such a configuration, CRL 406 is an outermost layer of component 400 such that CRL 406 is exposed to combustion gases 138 flowing passed component 400. In other embodiments, CRL 406 is adjacent and overlying surface 408 and TBC 404 is adjacent and overlaying CRL 406 such that CRL 406 is positioned between substrate 402 and TBC 404 and TBC is an outermost layer of component 400.

TBC 404 includes a second thickness $T_2$ within a range of approximately 0.001 inches and approximately 0.050 inches. Specifically, TBC 404 includes a second thickness $T_2$ within a range of approximately 0.001 inches and approximately 0.030 inches. More specifically, TBC 404 includes a second thickness $T_2$ within a range of approximately 0.003 inches and approximately 0.020 inches. Alternatively, TBC 404 includes any thickness $T_2$ that that provides thermal insulating properties and facilitates operation of component 400 as described herein. TBC 404 can be formed on or over surface 408 by a variety of conventional thermal barrier coating methods. For example, TBC 404 can be formed by physical vapor deposition (PVD), such as electron beam PVD (EB-PVD), filtered arc deposition, or by sputtering.

Similar to CRL 322, CRL 406 includes a first thickness $T_1$ within a range of approximately 0.0005 inches and approximately 0.030 inches. Specifically, CRL 406 includes a first thickness $T_1$ within a range of approximately 0.0005 inches and approximately 0.020 inches. More specifically, CRL 406 includes a first thickness $T_1$ within a range of approximately 0.0005 inches and approximately 0.010 inches. Even more specifically, CRL 406 includes a first thickness $T_1$ within a range of approximately 0.003 inches and approximately 0.010 inches. Alternatively, CRL 406 includes any thickness $T_1$ that facilitates operation of component 400 as described herein.

CRL 406 includes one or more layers of corrosion resistant materials such as corrosion resistant metal silicates. More specifically, in the embodiment shown in FIG. 5, CRL 406 is at least one layer of zirconium silicate applied to an outer surface 410 of TBC 404. Zirconium silicate was tested as a stable material in the presence of vanadium corrodents to provide a vanadium resistant layer or coating for gas turbine components, such as component 400. In the embodiment shown in FIG. 5, component 400 includes only substrate 402, TBC 404, and CRL 406 such that CRL 406 provides a vanadium resistant layer to protect TBC 404. In other embodiments, as described herein, component 400 includes additional layers of material on substrate 402. However, in the exemplary embodiment, and in such alternative embodiments, zirconium silicate CRL 406 is an outermost layer of component 400 such that CRL 406 is exposed to combustion gases 138 flowing passed component 400.

Furthermore, in the exemplary embodiment, CRL 406 includes only zirconium silicate. That is, CRL 406 includes 100% zirconium silicate and the zirconium silicate is not mixed with other corrosion prevention materials. More specifically, zirconium silicate may be mixed with a bonding material for bonding of CRL 406 to TBC 404, but the corrosion resistant material of CRL 406 is only zirconium silicate. Even more specifically, zirconium silicate is mixed with a binder material when CRL 406 is applied to TBC 404 using a slurry or dipping process, oxide bonding techniques, or pack cementation techniques, etc. When used alone, zirconium silicate CRL 406 is applied to TBC 404 using, physical vapor deposition (PVD) techniques (e.g., electron beam physical vapor deposition (EB-PVD), ion plasma, etc., thermal spray techniques (e.g., plasma spray such as air plasma spray), chemical vapor deposition (CVD) techniques, etc. Generally, CRL 406 is applied to TBC 404 using processes and methods known to those skilled in the art. In other embodiments, zirconium silicate may be mixed with other corrosion resistant materials to form CRL 406.

The reduction or prevention of contaminants into TBC 404 reduces the occurrence of fracture at or near the interface of TBC 404 and substrate 402. The reduction and prevention of the infiltration of contaminants into TBC 404 and the subsequent reduction and prevention of the infiltration of contaminants to substrate 402 reduces the occurrence of delamination, prevents spalling of TBC 404 and consequently maintains the integrity of TBC 404 and extends the life of substrate 402 and component 400.

The methods and systems described herein facilitate extending the service lifetime of turbine components by protecting the turbine components, such as, but not limited to, turbine rotor blades and turbine stator vanes, from vanadium corrosion. For example, embodiments of a turbine component include a substrate and a corrosion resistant layer coupled to the substrate. More specifically, a corrosion resistant layer of zirconium silicate is applied to the substrate to protect the substrate from exposure to a vanadium corrodent that may be channeled through the turbine. In addition, in some embodiments, a corrosion resistant layer of zirconium silicate is applied to a thermal barrier coating on the substrate to protect the thermal barrier coating from being exposed to the vanadium corrodents, which may limit the service lifetime of the thermal barrier coating.

Figure 6:
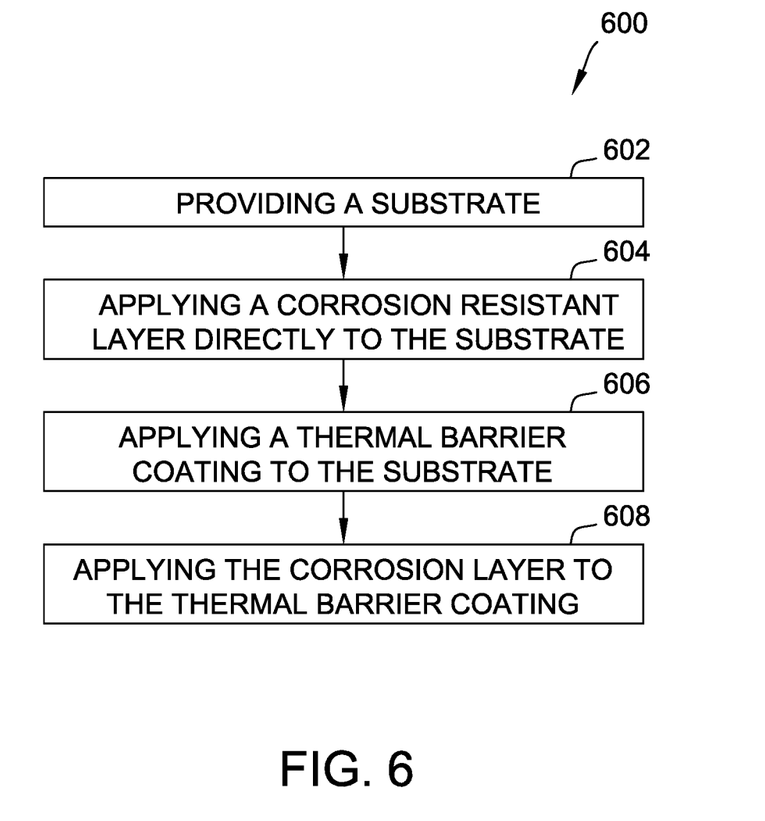
FIG. 6 is an exemplary method of assembling a gas turbine engine.

A method of assembling a gas turbine component is shown in FIG. 6. Method 600 includes providing 602 a substrate and applying 604 a corrosion resistant layer to the substrate. The corrosion resistant layer comprises zirconium silicate, and the corrosion resistant layer is configured to protect the substrate from exposure to a vanadium corrodent. Applying 602 the corrosion resistant layer includes applying only the corrosion resistant layer to the substrate such that the corrosion resistant layer is the only layer of material applied to the substrate. In some embodiments, applying the corrosion resistant layer includes applying a corrosion resistant layer that comprises 100% zirconium silicate.

The method 600 further includes applying a thermal barrier coating to the substrate and applying the corrosion resistant layer to the thermal barrier coating such that the thermal barrier coating is between the substrate and the corrosion resistant layer. The thermal barrier coating and the corrosion resistant layer are the only layers of material applied to the substrate.

An exemplary technical effect of the methods, systems, and apparatus described herein includes at least one of: (a) increasing the operating temperature of the turbine; (b) mitigating a corrosive effect or other degradation of an exterior surface of a turbine component; (c) mitigating an effect of spalling or other degradation of a thermal barrier coating on the exterior surface of a turbine component; (d) extending the service lifetime of the turbine components; and (e) reducing the maintenance costs and time of turbine components.

Exemplary embodiments of gas turbine components and methods of assembling the same are described above in detail. The methods and systems described herein are not limited to the specific embodiments described herein, but rather, components of the methods and systems may be utilized independently and separately from other components described herein. For example, the methods and systems described herein may have other applications not limited to practice with gas turbine assemblies, as described herein. Rather, the methods and systems described herein can be implemented and utilized in connection with various other industries.

While the invention has been described in terms of various specific embodiments, those skilled in the art will recognize that the invention can be practiced with modification within the spirit and scope of the claims.

PARTS LIST gas turbine assembly 100
compressor 102
combustor 104
turbine 106
rotor shaft 108
casing 110
centerline axis 112
rotor blades 114
stator vanes 116
rotor blades 118
stator vanes 120
first rotor stage 122
second rotor stage 124
third rotor stage 126
first stator stage 128
second stator stage 130
third stator stage 132
working gases 134
compressed gases 136
combustion gases 138
exhaust gases 140
section 200
stator stage 202
upstream rotor stage 204
downstream rotor stage 206
rotor blades 208
rotor blades 210
stator vane segments 212
stator vanes 214
component 300
airfoil 302
leading edge 304
trailing edge 306
pressure side 308
suction side 310
shank portion 312
dovetail portion 314
openings 316
outer surface 318
substrate 320
corrosion resistant layer (CRL) 322
surface 324
component 400
substrate 402
thermal barrier coating (TBC) 404
corrosion resistant layer (CRL) 406
surface 408
outer surface 410

What is claimed is:

1. A gas turbine component comprising:
a substrate; and
a corrosion resistant layer coupled directly against said substrate without an intermediate layer extending between the corrosion resistant layer and the substrate, wherein said corrosion resistant layer comprises zirconium silicate, wherein said corrosion resistant layer is configured to protect said substrate from exposure to a vanadium corrodent and to act as a thermal barrier coating on said substrate.

2. A gas turbine component in accordance with claim 1, wherein said component comprises only said substrate and said corrosion resistant layer.

3. A gas turbine component in accordance with claim 1, wherein said corrosion resistant layer comprises a corrosion prevention material mixed with a bonding material, wherein the corrosion prevention material is 100% zirconium silicate and the corrosion resistant layer is not mixed with other corrosion prevention materials.

4. A gas turbine component in accordance with claim 1, wherein said corrosion resistant layer comprises an outermost layer of said component.

5. A gas turbine component in accordance with claim 1, wherein said corrosion resistant layer comprises a thickness in a range of approximately 0.0005 inches and approximately 0.030 inches.

6. A gas turbine component in accordance with claim 1, further comprising a thermal barrier coating coupled to said corrosion resistant layer.

7. A gas turbine component in accordance with claim 6, wherein said corrosion resistant layer is coupled between said thermal barrier coating and said substrate.

8. A gas turbine component in accordance with claim 6, wherein said component comprises only said thermal barrier coating, said substrate, and said corrosion resistant layer.

9. A gas turbine component in accordance with claim 6, wherein said thermal barrier coating comprises a thickness in a range of approximately 0.001 inches and approximately 0.050 inches.

10. A method of assembling a gas turbine component, said method comprising:
providing a substrate; and
applying a corrosion resistant layer directly against the substrate without an intermediate layer between the corrosion resistant layer and the substrate, wherein the corrosion resistant layer comprises zirconium silicate, and wherein the corrosion resistant layer is configured to protect the substrate from exposure to a vanadium corrodent and to act as a thermal barrier coating on said substrate.

11. A method in accordance with claim 10, wherein applying the corrosion resistant layer includes applying only the corrosion resistant layer to the substrate such that the corrosion resistant layer is the only layer of material applied against the substrate.

12. A method in accordance with claim 10, wherein applying the corrosion resistant layer includes applying the corrosion resistant layer that comprises a corrosion prevention material mixed with a bonding material, wherein the corrosion prevention material is 100% zirconium silicate and the corrosion resistant layer is not mixed with other corrosion prevention materials.

13. A method in accordance with claim 10, wherein applying the corrosion resistant layer to the substrate comprises:
applying a thermal barrier coating to the corrosion resistant layer such that the corrosion resistant layer is between the substrate and the thermal barrier coating
wherein the thermal barrier coating and the corrosion resistant layer are the only materials applied to the substrate.

14. A turbine for use in a gas turbine engine, said turbine comprising:
a turbine blade; and
a corrosion resistant layer coupled directly to said turbine blade without an intermediate layer between the corrosion resistant layer and said turbine blade, wherein said corrosion resistant layer comprises zirconium silicate, wherein said corrosion resistant layer is configured to protect said turbine blade from exposure to a vanadium corrodent and to act as a thermal barrier coating on said turbine blade.

15. A turbine in accordance with claim 14, wherein said turbine blade is only coated with said corrosion resistant layer.

16. A turbine in accordance with claim 14, wherein said corrosion resistant layer comprises an outermost layer of said turbine blade.

17. A turbine in accordance with claim 14, further comprising a thermal barrier coating coupled to said corrosion resistant layer, wherein said corrosion resistant layer is coupled between said thermal barrier coating and said turbine blade.

18. A turbine in accordance with claim 17, wherein said thermal barrier coating comprises YSZ and does not comprise zirconium silicate.

19. A turbine in accordance with claim 17, wherein said turbine blade is formed from at least one of a metallic alloy and a ceramic material.

* * * * *

UNITED STATES PATENT AND TRADEMARK OFFICE
CERTIFICATE OF CORRECTION

PATENT NO. : 11,274,562 B2
APPLICATION NO. : 16/608214
DATED : March 15, 2022
INVENTOR(S) : Jianzhi Zhao et al.

It is certified that error appears in the above-identified patent and that said Letters Patent is hereby corrected as shown below:

In the Claims

In Claim 7, Column 10, Line 66, delete "layer is coupled between" and insert therefor -- layer is between --.

Signed and Sealed this
Twenty-sixth Day of December, 2023

Katherine Kelly Vidal
*Director of the United States Patent and Trademark Office*